United States Patent Office 3,565,854
Patented Feb. 23, 1971

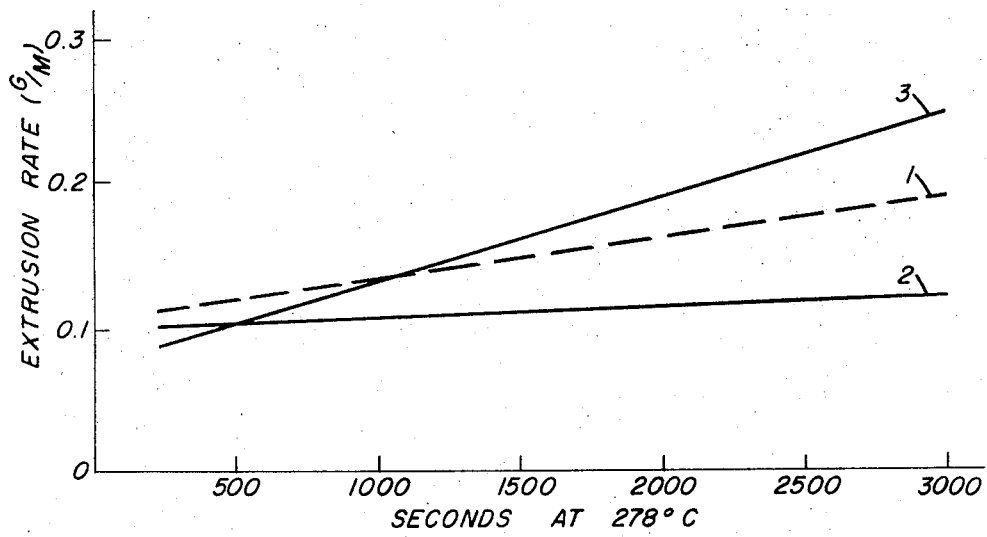

3,565,854
HEAT STABILIZATION OF POLYESTERS
Kenneth T. Barkey, C. Shelburn Hunter, and Walter L. Predmore, Jr., Rochester, N.Y., assignors to Eastman Kodak Company, Rochester, N.Y., a corporation of New Jersey
Filed July 2, 1969, Ser. No. 838,472
Int. Cl. C08g 51/60
U.S. Cl. 260—45.8     6 Claims

ABSTRACT OF THE DISCLOSURE

It has been discovered that polyesters can be stabilized against the spontaneous degradation which the polyesters ordinarily undergo when they are heated to temperatures subsantially above their melting points for a period of time by the incorporation thereinto of a small amount of flavanthrone, which is compatible with the polyester, is ultraviolet absorbing, and which is, itself, stable at said temperatures.

---

This invention relates to new and improved polyester compositions having the valuable property of being stabilized against spontaneous thermal degradation under ordinary polyester melt processing conditions.

It is well known that linear polyesters such as poly(ethylene terephthalate) thermally degrade spontaneously when such materials are heated for any extended period of time at temperatures substantially above their melting points. Such spontaneous degradation reveals itself in the manner in which it affects some of the important physical and chemical properties of the polyester material. For example, exposure of the polyester to temperatures at which it would ordinarily be extruded and/or molded or cast into some useful form [such as about 275° C. for poly(ethylene terephthalate)] for only a few minutes results in (a) the intrinsic viscosity of polyester dropping fairly sharply, (b) more unwanted carboxylic acid and aldehydric "ends" appearing in the polymer and (c) an undesirable brownish discoloration developing fairly rapidly in the molten material. All of these evidences of degradation are almost invariably undesirable. In fact, for some intended end uses of polyesters, the amount of loss of viscosity (and the concurrent loss of other related physical properties) that occurs over a period of time of as little as 20 minutes sometimes makes it necessary to discard the thermally degraded material. Such prolonged exposure to high temperatures can occur, for example, when an extruding machine is temporarily stopped for any of a number of possible reasons, and the machine must be maintained in the "ready" condition for subsequent continuation of the extrusion process.

Many attempts have been made heretofore to stabilize linear polyester material against high temperature thermal degradation. However, effective stabilizers that function under such high temperature conditions are extremely difficult to discover. Materials that are effective stabilizers to prevent the thermal degradation of other polymeric materials such as polyethylene or polyvinyl halides are either not compatible with the polyester materials or simply do not function in the required manner at the relatively higher temperatures in which the present problem exists (since the mechanism of thermal degradation differs between most polymer types). Also, many materials that are compatible with, and can be dissolved into, the linear polyester materials have either no effect on the spontaneous thermal degradation of the polyester or have even an undesirable accelerating effect on the degradation.

It has now been discovered that the undesired spontaneous high temperature thermal degradation of linear polyesters (having repeating residue units of at least one glycol and at least one dicarboxylic acid) can be prevented by the incorporation into the polyester material of a small, but effective, stabilizing amount of flavanthrone.

The linear polyester materials in which the problem solved by the present invention exists and to which the present invention relates are linear polyesters of at least one glycol having 2–10 carbon atoms and at least one dibasic acid comprising at least 50 mole percent of an acid having two carboxyl radicals attached to a carbocyclic nucleus having from 4 to 6 carbon atoms per ring, said ester having a number average molecular weight of 10,000 to about 100,000, an inherent viscosity in a mixture of 60% phenol and 40% chlorobenzene of at least 0.3 and melting at from about 175° to about 350° C.

In this regard, particularly preferred polyester compositions contain (1) poly(ethylene terephthalate), poly(1,4-cyclohexylenedimethylene terephthalate), poly(ethylene isophthalate), poly(ethylene naphthalenedicarboxylate), or a mixture of at least two of these, as the polyester component and (2) an effective stabilizing amount (generally 50–2000 parts per million) of flavanthrone.

In the practice of the present invention, it has been found that only a very small amount of flavanthrone needs to be present in the molten polyester in order for at least a small amount of benefit to be obtained. However, generally for most uses a relatively high degree of thermal stabilization of the polyester is desired. Therefore, generally at least about 50 parts per million (based on the amount of polyester present) of flavanthrone should be present in the resulting stabilized composition. While there is apparently no critical upper limit with regard to the amount of flavanthrone that can be used to effectively stabilize the polyester compositions of this invention, generally, because of cost considerations, at most about 5,000 parts per million of the flavanthrone should be used. For optimum results, if it is preferred that the total amount of flavanthrone present in the polyester compositions of the present invention be within the range of from about 100 to about 2000 parts per million.

Apparently the particular manner whereby the flavanthrone is incorporated into the polyester material is also not critical. The flavanthrone can, for example, be simply physically mixed with powdered or pelletized or flaked polyester prior to the time the materials are melted together in the extruder. If desired, in intimate blend of the polyester and flavanthrone can be prepared prior to the extrusion step by either melting the components together in a separate step or even by dissolving them together in a common solvent system and subsequently removing the solvent. In any event, apparently all that is needed to effectively stabilize the polyesters with flavanthrone is to uniformly disperse (or dissolve) the flavanthrone through the polyester.

Referring now to the drawing, which is illustrative of the data appearing in Table one, below, in graphic form; line 1 illustrates the degradation in viscosity of poly(ethylene terephthalate) containing only conventional catalysts and stabilizers (to prevent oxidative degradation). Line 2, which has a slope that is almost flat, as compared with the slope of line 1, is illustrative of the high degree of high temperature thermal stabilization that can be accomplished by practicing the present invention. Line 3 illustrates the increase in the rate of thermal degradation that results when certain other types of chemical additives are present in the heated polyester. It should be noted that since the ordinate in the drawing represents an increase in the total amount of extruded polyester material in a given length if time, and since increasing rates result from decreasing viscosities, the steeper the slope of the curves illustrated in this figure, the poorer is the high temperature thermal stability of the composition being tested. Thus, the use of an "ideal" stabilizer would be expected to result in a flat line. From the drawing and from Table 1 below it can be seen that the use of the stabilizer of this invention can very closely approximate such an "ideal stabilizer."

EXAMPLES

In order to evaluate high temperature thermal stabilization of polyesters, poly(ethylene terephthalate) was chosen as a typical example of such linear polyester materials. Except for the particular melting point and the actual temperature region in which spontaneous thermal degradation of the polyester takes place at an accelerated rate, other linear polyester materials falling within the generic description set out above are expected to yield data comparable to that which results from tests performed on poly(ethylene terephthalate). The intrinsic viscosity (tested in a 60:40 blend of phenol and chlorobenzene) of the poly(ethylene terephthalate) used in this test is initially 0.62. In the following examples all parts set out are by weight unless otherwise specified.

Ten thousand parts of powdered poly(ethylene terephthalate) are blended in a conventional stainless steel blender with ten parts of flavanthrone (in powdered form) for 20 minutes. The resulting blend is then dried under a high vacuum (500 microns pressure) at 215° C. for one half hour. After releasing the vacuum with nitrogen and while carefully maintaining the resulting mixture under a blanket of nitrogen, the resulting mixture is transferred to a conventional melt rheometer and heated to 278° C. under a pressure of 400 lbs. Samples are periodically collected from the rheometer via a closely timed extrusion and subsequently weighed in order to obtain the data appearing in Table 1 below. The particular materials tested are assigned "example" designations A through E. The "control" polyester material (containing no test additives) is assigned designation A. The flavanthrone test is designated Example No. B, while several other somewhat chemically similar materials have been designated C through E in this table.

TABLE 1.—EXTRUSION DATA FOR POLY(ETHYLENE TEREPHTHALATE) AT 278° C.

| Example No.[1]: | Time, seconds | Grams/ minute | Time, seconds | Grams/ minute | Time, seconds | Grams/ minute |
|---|---|---|---|---|---|---|
| A | 400–600 | 0.11 | 850–910 | 0.13 | 2,500–2,650 | 0.17 |
| B | 300–420 | 0.11 | 1,800–1,920 | 0.12 | 3,600–3,720 | 0.14 |
| C | 470–490 | 0.10 | 850–970 | 0.12 | 2,030–2,150 | 0.20 |
| D | 300–420 | 0.11 | 950–1,160 | 0.13 | 2,000–2,120 | [2] 0.16 |
| E | 800–1,000 | 0.09 | 1,800–1,920 | 0.10 | 3,720–3,900 | 0.17 |

[1] Samples tested are identified as follows:
(A) Control—no additive.
(B) Flavanthrone.
(C) 4-p-bromophenyl-3-cyano 2(5H)furanone.
(D) 3-carbamoyl-5-(2,6-dichlorobenzylidene)-4-phenyl-2(5H)furanone
(E) 3-p-nitroanilino-1-p-nitrophenyl iminoisoindolenine.
[2] Line 3 in the drawing.

The procedure described above has made it possible to illustrate still another advantage of the compositions of the present invention. That is the flavanthrone will not sublime from the molten compositions. Sublimation out of the molten system of various additives has been a problem in the past, particularly for materials that might conceivably perform as the desired high temperature stabilizers. Still another advantage of the present compositions is that the compositions of this invention can prevent ultraviolet light from passing through the composition even though the composition might otherwise appear to be completely transparent.

Flavanthrone (Cl–70600) has the structure:

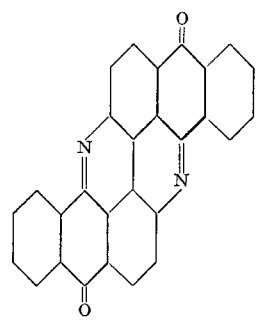

The invention has been described in detail with particular reference to preferred embodiments thereof, but it will be understood that variations and modifications can be effected within the spirit and scope of the invention.

We claim:
1. A heat-stabilized polyester composition comprising a linear polyester of repeating glycol and dicarboxylic acid residues having a molecular weight of at least about 10,000 and a heat-stabilizing amount of flavanthrone.

2. A heat-stabilized composition as in claim 1, wherein said polyester is selected from the group consisting of poly(ethylene terephthalate), poly(1,4-cyclohexylene dimethyleneterephthalate), poly(ethylene isophthalate), poly(ethylene naphthalenedicarboxylate) and mixtures thereof.

3. A heat-stabilized polyester composition as in claim 1, wherein said amount of said flavanthrone is from about 50 to about 5000 parts per million, based on the weight of said polyester in said composition.

4. A film element comprising poly(ethylene terephthalate) and from about 50 to about 5000 parts per million, based on the weight of said poly(ethylene terephthalate) of flavanthrone.

5. Poly(ethylene terephthalate) film having, dissolved therein, from about 100 to about 2000 parts per million of flavanthrone; said poly(ethylene terephthalate) having an intrinsic viscosity of from about 0.3 to about 2.

6. A heat-stabilized polyester composition as in claim 1, wherein said composition is in the form of fibers.

References Cited

UNITED STATES PATENTS 3,491,057   1/1970   Kato et al. _____ 260—45.8

DONALD A. CZAJA, Primary Examiner

R. A. WHITE, Assistant Examiner